Patented Feb. 11, 1947

2,415,555

UNITED STATES PATENT OFFICE 2,415,555

ORGANOMETALLIC COMPOUNDS CONTAINING 1,3,5-TRIAZINE RINGS

Ernst A. H. Friedheim, New York, N. Y.

No Drawing. Application September 25, 1942,
Serial No. 459,636

7 Claims. (Cl. 260—242)

This invention relates to therapeutically active compounds containing a 1,3,5-triazine ring linked by a nitrogen-containing bridge to an aromatic organic radical and to methods of preparing such compounds. It has particular relation to 1,3,5-triazine derivatives, in which the triazine ring is linked by a nitrogen-containing bridge to an aromatic radical containing Sb, P, Se or Hg.

The compounds according to the present invention correspond to the general formula

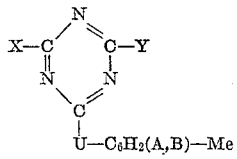

In this formula, X and Y may be equal or different and may represent halogens or residues of any inorganic or organic, aliphatic or cyclic, iso-cyclic or heterocyclic, monocyclic or polycyclic molecule containing an active hydrogen atom capable of reacting with a cyanuric halide with the formation of hydrogen halide. For example, X and Y may be selected from the group consisting of Cl, Br, I, F, H, —OH, —O-alkyl, —O - acyl, —NH$_2$, —NH - alkyl, —N - alkyl$_2$, —NH-acyl, —NH—NH$_2$, —NH—NH-alkyl, —N-alkyl—NH$_2$, —N-alkyl - NH-alkyl, —NH—NH-acyl, —N-acyl—NH$_2$, —N-acyl—NH-acyl, —NH-aryl, —NH(CH$_2$)$_n$CONH$_2$, —NH(CH$_2$)$_n$NH$_2$, —NH(CH$_2$)$_n$NH - alkyl, —NH(CH$_2$)$_n$N - dialkyl, —NH(CH$_2$)$_n$OH, —NH.CH$_2$CHOHCH$_2$OH, —NHOH, —NHCN,

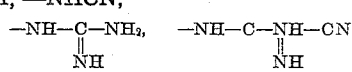

residues of cyanamide derivatives, residues of substituted guanidines, amino-derivatives of carbohydrates, particularly amino-derivatives of monosaccharides, such as glucose-amine, —SH, substituents of the type —S—R wherein R stands for any aliphatic or cyclic group capable of carrying a —SH group, such as thioglycolic acid and thiophenol, alkyl radicals and their substitution products, isocyclic and heterocyclic radicals, which may be monocyclic or polycyclic, and their substitution products, such as O-aryl groups, substituted aryl radicals, such as those corresponding to the formula

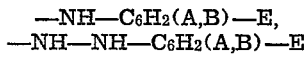

wherein A and B may represent equal or different substituents defined further below, and E may represent a radical being in ortho, meta or para-position to the —NH— or —NH—NH— group, and selected from the group consisting of —SO$_3$H, —SO$_2$NH$_2$, —COOH, —Hg—, AsO$_3$H$_2$, —AsO, —AsS, —As=halogen$_2$, —SbO$_3$H$_2$, —PO$_3$H$_2$ and —SeO$_3$H$_2$. X and/or Y may also stand for radicals of the formula —U—C$_6$H$_2$(A,B)—Me or for 1,3,5-triazine groups or residues of triazine derivatives. These radicals and triazine groups or residues of triazine derivatives may be linked directly or indirectly to the ring carbon atoms of the first triazine ring. In the latter case the link between the substituting radical and the ring carbon atom of the first triazine ring may be formed by a cyclic or aliphatic amine radical, f. e. by an —NH-aryl, —NH-alkyl, —NH—NH-aryl or —NH—NH-alkyl radical. The link between the first and the substituting triazine ring may be formed by an —NH—, —NH—NH— group or an aliphatic or cyclic diamine, f. e. of the formula —NH—C$_6$H$_4$—NH— or —NH—CH$_2$—CH$_2$—NH—.

U is selected from the group consisting of —NH— and —NH—NH— radicals; C$_6$ represents a benzene ring;

A and B may be the same or different and are selected from the group consisting of H, —OH, —O-alkyl, —O-acyl, —NO$_2$, —NH$_2$, —NH—NH$_2$, —NH-acyl, —NH-alkyl, —N-alkyl$_2$, alkyl and halogen.

Me stands for metallic radicals selected from the group consisting of —SbO$_3$H$_2$, —PO$_3$H$_2$, —SeO$_3$H$_2$, and —Hg—, said radicals being in ortho, meta or para-position with respect to U.

The compounds embodying the present invention may be prepared by reacting a derivative of 1,3,5-triazine containing at least one active halogen with a suitable aminophenyl or hydrazinophenyl metallic compound carrying an amino group which may be attached directly or indirectly to a ring carbon atom, such as —NH$_2$, NH$_2$—NH— or NH$_2$—(CH$_2$)$_n$. The compounds according to the invention may also be obtained by reacting a halogen-phenyl metallic compound with a triazine derivative containing at least one amino group with active hydrogen, said amino group being attached directly or indirectly to a nuclear carbon atom of the triazine ring.

*Example I.*—p-Aminophenyl phosphoric acid is treated in dilute hydrochloric acid with sodium nitrite, and the resulting diazo solution is run with stirring to an excess of a concentrated aqueous solution of sodium hydrosulfite and sodium acetate. A white precipitate of p-phenylhydrazino phosphoric acid is formed, which is purified by reprecipitation from its boneblacked alkaline solution with acetic acid.

A 10% solution of one mol of phenylhydrazinophosphoric acid and 1 mol of sodium carbonate, is added with stirring and cooling to a 10% suspension of 1,1 mol of cyanuric chloride in ice water, and stirring and cooling is continued until the reaction for a free hydrazino group has become negative. The reaction mixture is then acidified with hydrochloric acid, and the resulting precipitate of [2,4-dichloro-1,3,5-triazinyl-6]-p-hydrazino-phenylphosphoric acid is filtered off and purified by reprecipitation from its boneblacked alkaline solution with hydrochloric acid. The compound is soluble in aqueous alkali and insoluble in alcohol, acetone and ether. It dissolves without color in concentrated sulfuric acid, but this solution takes a deep purple color on addition of solid sodium nitrate.

In the dichloro-triazinyl compound thus formed, the Cl-atoms of the triazine ring can be replaced by $-NH_2$ by heating the moist compound in an open vessel or in an autoclave with an excess of aqueous 25% ammonia to 100°-130° C.

Phenylhydrazino stibinic acid and phenylhydrazino mercuric chloride may be prepared and reacted with cyanuric chloride by a process analogous in all ways to that described above in connection with phenylhydrazino phosphoric acid.

*Example II.*—A solution of 28.6 parts by weight of soduim-p-aminophenyl-stibinate in 200 parts by weight of water is added dropwise to a fine suspension of 18.3 parts by weight of cyanuric chloride (2,4,6-trichloro-1,3,5-triazine) in 500 parts by weight of water in the course of 1 hour while cooling and stirring vigorously. After this time the primary aromatic amine has disappeared. The white reaction product which forms a suspension is filtered off, washed with water and then with acetone.

The resulting p-[2,4-dichloro-1,3,5-triazinyl-(6)]-aminophenyl-stibinic acid of the formula

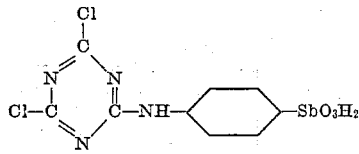

is a white powder insoluble in cold water, which can be dissolved in aqueous alkalis without coloration. The compound is insoluble in alcohol, ether, benzene. The solution in concentrated sulphuric acid is colorless.

*Example III.*—The moist p-[2,4-dichloro-1,3,5-triazinyl-(6)]-aminophenyl-stibinic acid obtained in accordance with Example II is covered with 10 times the quantity of 10% ammonia and shaken at 45° C. for 1 hour, whereby the product goes into complete solution. The excess ammonia is removed under reduced pressure. On acidification with hydrochloric acid p-[2-chloro-4-amino-1,3,5-triazinyl-(6)]-aminophenyl-stibinic acid of the formula

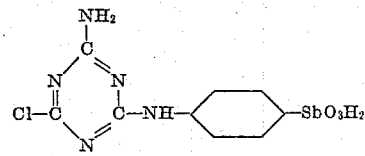

is isolated in the form of small white crystals which are filtered off and washed with water and acetone.

The resulting compound is soluble in alkalis and on warming with an excess of dilute mineral acid. It is insoluble in water, alcohol, ether and benzene.

*Example IV.*—The moist p-[2,4-dichloro-1,3,5-triazinyl-(6)]-aminophenyl-stibinic acid prepared in accordance with Example II is heated in an autoclave under pressure to 110-130° C. for about two hours with 10 times the quantity of 25% ammonia. When excess ammonia has been driven off, the product is treated in the cold with excess hydrochloric acid, whereupon the hydrochloride of p-[2,4-diamino-1,3,5-triazinyl-(6)]-aminophenyl-stibinic acid of the formula

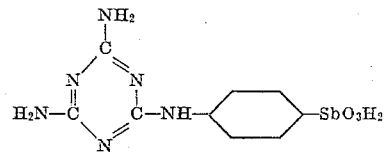

separates in small white crystals. It is sucked off and washed with cold water. The compound is soluble in aqueous alkalis.

The reaction of p-[2,4-dichloro-1,3,5-triazinyl-(6)]-aminophenyl-arsonic acid with ammonia may also take place in an open vessel and yields p-[2,4-diamino-1,3,5-triazinyl-(6)]-aminophenyl-stibinic acid.

*Example V.*—29 parts by weight of chloro-cyanuric-diamide are boiled for about 2 hours under reflux with a solution of 28.6 parts by weight of sodium aminophenyl stibinate in 300 parts by weight of water whereupon the stibanilic acid disappears. The white reaction product is brought into solution by the addition of ammonia. The sulphate of p-[2,4-diamino-1,3,5-triazinyl-(6)]-aminophenyl-stibinic acid is precipitated from the filtered solution by sulphuric acid.

*Example VI.*—10 parts by weight of a 17% solution of methyl-amine are poured over 1 part by weight of p-[2,4-dichloro-1,3,5-triazinyl-(6)]-aminophenyl-stibinic acid obtained in accordance with Example II whereby solution sets in with evolution of heat. The solution is boiled until the excess of methylamine is driven off. Sufficient hydrochloric acid is then added to render the product just acid to congo paper upon which the hydrochloride of p-[2,4-di-methyl-amino-1,3,5-triazinyl-(6)]-amino-phenyl-stibinic acid of the formula

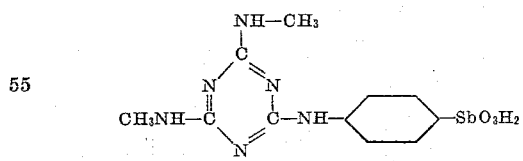

precipitates in small white, crystalline needles on cooling. These needles are filtered off and washed with cold water.

The p-[2,4-dichloro-1,3,5-triazinyl-(6)]-aminophenyl-stibinic acid may be reacted in a substantially similar manner with other alkyl amines, dialkyl amines, hydroxy-alkyl amines and dialkyl-amino-alkyl amines.

Instead of p-amino-phenyl-stibinic acid, its derivatives or isomers, such as 4-oxy-3-aminophenyl-stibinic acid-(1), or 2-oxy-4-aminophenyl-stibinic acid may be employed in carrying out the process described in the above Examples II-VI. Furthermore, analogous reactions take place when aminophenyl phosphoric acid or aminophenyl mercuric acetate is reacted with the corresponding triazine derivatives, and the condensation products formed are treated in the above described manner.

*Example VII.*—One part by weight of (2,4-dichloro-1,3,5-triazinyl-6)-p-aminophenyl mercuric chloride is treated with 4 parts by weight of a concentrated solution of hydrazine hydrate. The resulting dihydrazino-triazinyl-p-amino mercuric oxide is treated with hot 50% acetic acid and forms the corresponding mercuric acetate.

*Example VIII.*—An aqueous 10% solution of 1 mol of the sodium salt of m-aminophenyl selenic acid of the formula

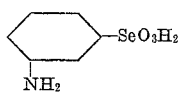

said solution also containing 1 mol of sodium bicarbonate, is slowly added to an ice-cold, aqueous 10% suspension of 1.1 mol of cyanuric chloride, and reacted until no more diazotable aromatic amine can be found in the reaction mixture. Upon acidifying the solution with hydrochloric acid, [2,4-dichloro-1,3,5-triazinyl-(6)]-m-amino-selenic acid is obtained as a white precipitate, which is filtered off, and then washed with diluted hydrochloric acid, water, acetone and ether. The substance thus obtained may be purified by dissolving it in aqueous sodium bicarbonate solution, boneblacking, filtration, and re-precipitation with hydrochloric acid. It forms a white powder soluble in an aqueous solution of sodium bicarbonate, sodium carbonate and NaOH. It is insoluble in diluted acetic acid, HCl, alcohol and ether.

The chlorine atoms of the triazine ring in the compound obtained according to this example may be reacted with $H_3N$ substantially in the manner described in the foregoing examples.

Further compounds embodying the present invention, in which X and/or Y stands for a radical other than those described in the above examples, may be obtained, f. e., by first preparing an X—Y-triazine compound, in which at least one carbon atom of the triazine ring carries a halogen, and reacting such triazine compound with a suitable compound of the formula

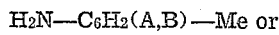

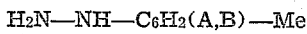

These reactions between the X—Y-triazine-halogen compounds and the amino- or hydrazinophenyl- compounds of the above formulas may be carried out in a manner analogous to that described in the foregoing examples.

Furthermore, substances embodying the present invention may also be obtained by reacting a compound corresponding to the general formula

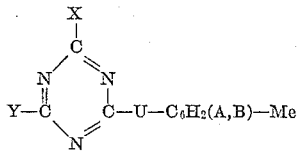

and containing as X and/or Y active groups, f. e., halogen or an —$NH_2$ group, with any compound capable of combining with or replacing X and/or Y. A compound of the formula

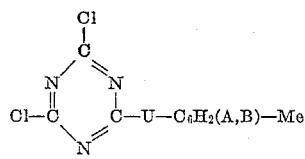

may be reacted, for example with a compound of the formula

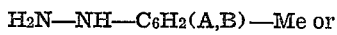

Compounds embodying this invention and carrying A,B substituents other than those described in the foregoing examples, may be obtained by a procedure substantially analogous to the procedures described in said examples.

The new compounds according to this invention are adapted to be used as medicinal preparations. They exert a therapeutic action in infectious diseases, such as those caused by certain protozoae and certain spirochetae, and have a relatively low toxicity.

It will be understood that this invention may be carried out in other specific ways than those herein set forth, and the examples should be, therefore, considered as illustrative and not restrictive within the spirit of the invention as defined in the appended claims.

I claim:

1. A new 1,3,5-triazine compound of the formula

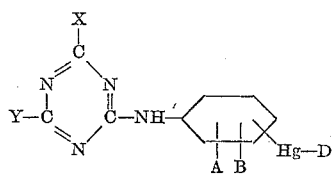

wherein X and Y are selected from the group consisting of halogen and amino radicals, A and B are selected from the group consisting of hydrogen, halogen, $NO_2$, OH, —O-alkyl, amino, and alkyl radicals, and —Hg—D stands for a radical selected from the group consisting of —Hg-halogen, —Hg—OH and —HgO.$COCH_3$.

2. A new 1,3,5-triazine compound of the formula

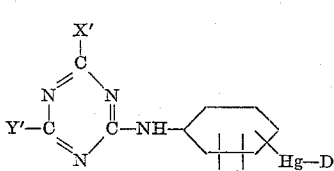

wherein one X' and Y' represents a halogen atom, and the other represents a radical selected from the group consisting of halogen and amino radicals, A and B are selected from the group consisting of hydrogen, halogen, $NO_2$, OH, —O-alkyl, amino, and alkyl radicals, and —Hg—D stands for a radical selected from the group consisting of —Hg-halogen, —Hg—OH and —HgO.$COCH_3$.

3. A compound of the formula

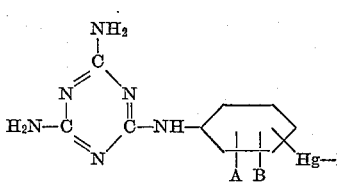

wherein A and B are selected from the group consisting of hydrogen, halogen, $NO_2$, OH, —O-alkyl, amino and alkyl radicals, and —Hg—D stands for a radical selected from the group consisting of —Hg-halogen, —Hg—OH and —HgO.COCH₃.

4. A compound of the formula

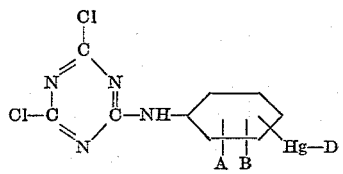

wherein A and B are selected from the group consisting of hydrogen, halogen, NO₂, OH, —O-alkyl, amino, and alkyl radicals, and —Hg—D stands for a radical selected from the group consisting of —Hg-halogen, —Hg—OH and HgO.COCH₃.

5. In a process for the preparation of a 1,3,5-triazine derivative of the formula

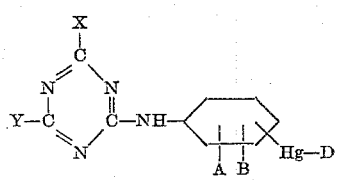

wherein X and Y are selected from the group consisting of halogen and amino radicals, A and B are selected from the group consisting of hydrogen, halogen, NO₂, OH, —O-alkyl, amino, and alkyl radicals, and —Hg—D stands for a radical selected from the group consisting of —Hg-halogen, —Hg—OH and —HgO.COCH₃, the step comprising reacting a triazine derivative of of the formula

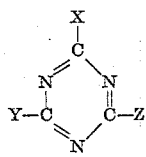

with a compound of the formula

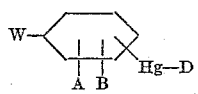

wherein one of Z and W is a halogen radical and the other is an amino radical.

6. In a process for the preparation of a 1,3,5-triazine derivative of the formula

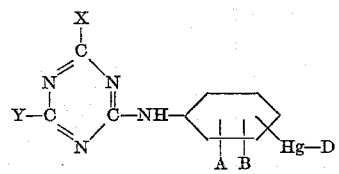

wherein X and Y are selected from the group consisting of halogen and amino radicals, A and B are selected from the group consisting of hydrogen, halogen, NO₂, OH, —O-alkyl, amino, and alkyl radicals, and —Hg—D stands for a radical selected from the group consisting of —Hg-halogen, —Hg—OH and —HgO.OCOCH₃, the step comprising reacting a triazine derivative of the formula

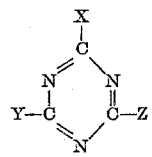

wherein Z stands for a halogen, with a compound of the formula

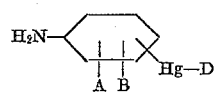

7. In a process for the preparation of a 1,3,5-triazine derivative of the formula

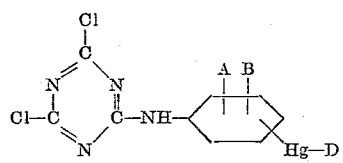

wherein A and B are selected from the group consisting of hydrogen, halogen, NO₂, OH, —O-alkyl, amino, and alkyl radicals, and —Hg—D stands for a radical selected from the group consisting of —Hg-halogen, —Hg—OH and —HgO.OCOCH₃, the step comprising reacting an aqueous suspension of cyanuric chloride with a compound of the formula

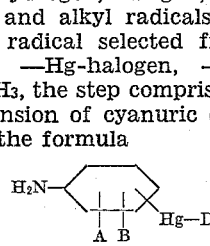

ERNST A. H. FRIEDHEIM.

REFERENCES CITED

The following references are of record in the file of this patent:

UNITED STATES PATENTS

| Number | Name | Date |
|---|---|---|
| 2,250,553 | Ruskin | July 29, 1941 |
| 2,259,492 | Ruskin | Oct. 21, 1941 |
| 2,312,195 | Ruskin | Feb. 23, 1943 |

FOREIGN PATENTS

| Number | Country | Date |
|---|---|---|
| 214,903 | Swiss | Aug. 16, 1941 |
| 537,690 | British | July 2, 1941 |